US006826005B2

(12) United States Patent
Hakamata et al.

(10) Patent No.: US 6,826,005 B2
(45) Date of Patent: *Nov. 30, 2004

(54) DISK ARRAY UNIT

(75) Inventors: Kazuo Hakamata, Odawara (JP);
Kenichi Takamoto, Odawara (JP);
Masaaki Kobayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/412,232

(22) Filed: Apr. 14, 2003

(65) Prior Publication Data

US 2003/0193732 A1 Oct. 16, 2003

Related U.S. Application Data

(63) Continuation of application No. 09/383,370, filed on Aug. 26, 1999, now Pat. No. 6,583,947.

(30) Foreign Application Priority Data

Apr. 5, 1999 (JP) .......................................... 11-097290

(51) Int. Cl.[7] .......................... G11B 19/02; G11B 15/46; G06F 1/26
(52) U.S. Cl. ...................... 360/69; 360/73.03; 713/323; 713/324; 711/114; 714/42
(58) Field of Search ................................ 360/69, 73.03; 713/323, 324, 322, 300, 502; 711/5, 114, 111; 714/45, 42

(56) References Cited

U.S. PATENT DOCUMENTS

| 5,361,364 | A | 11/1994 | Nagashige et al. ......... 395/750 |
| 5,828,568 | A | 10/1998 | Sunakawa et al. ............ 700/79 |
| 5,926,404 | A | 7/1999 | Zeller et al. ................. 364/707 |
| 5,937,433 | A | 8/1999 | Lee et al. .................... 711/158 |
| 6,052,791 | A | 4/2000 | Chen et al. .................. 713/300 |
| 6,192,248 | B1 | 2/2001 | Deenadhayalan et al. ... 713/324 |
| 6,233,691 | B1 | 5/2001 | Atkinson .................... 713/323 |
| 6,583,947 | B1 * | 6/2003 | Hakamata et al. ............ 360/69 |

FOREIGN PATENT DOCUMENTS

JP    7302138    11/1995

* cited by examiner

Primary Examiner—Andrew L. Sniezek
(74) Attorney, Agent, or Firm—Antonelli, Terry, Stout & Kraus, LLP

(57) ABSTRACT

A disk array unit connected to a host unit to give information thereto and receive information therefrom. The disk unit includes a plurality of disk units for storing information transmitted from the host unit and a management information recording device, formed by utilizing information storage areas in the disk units, for causing information relating to a logical unit for storing information from the host unit to correspond to information relating to the units. The invention further includes a control unit, when there is no access from the host unit to the logical unit for a predetermined time, for determining the disk units corresponding to the logical unit based on information recorded in the management information recording device and performing power saving of power supply for the disk units.

36 Claims, 5 Drawing Sheets

FIG. 2

MEMORY 162

MAGNETIC DISK UNIT MANAGEMENT TABLE 250

| PRESET LUN | MANAGEMENT LUN | ACCESS TIME | MAGNETIC DISK UNIT POSITION | RELATING LUN | POWER SAVING START TIME |
|---|---|---|---|---|---|
|  |  |  |  |  |  |

POWER SAVING WAITING TIME 260

DIAGNOSIS START TIME 270

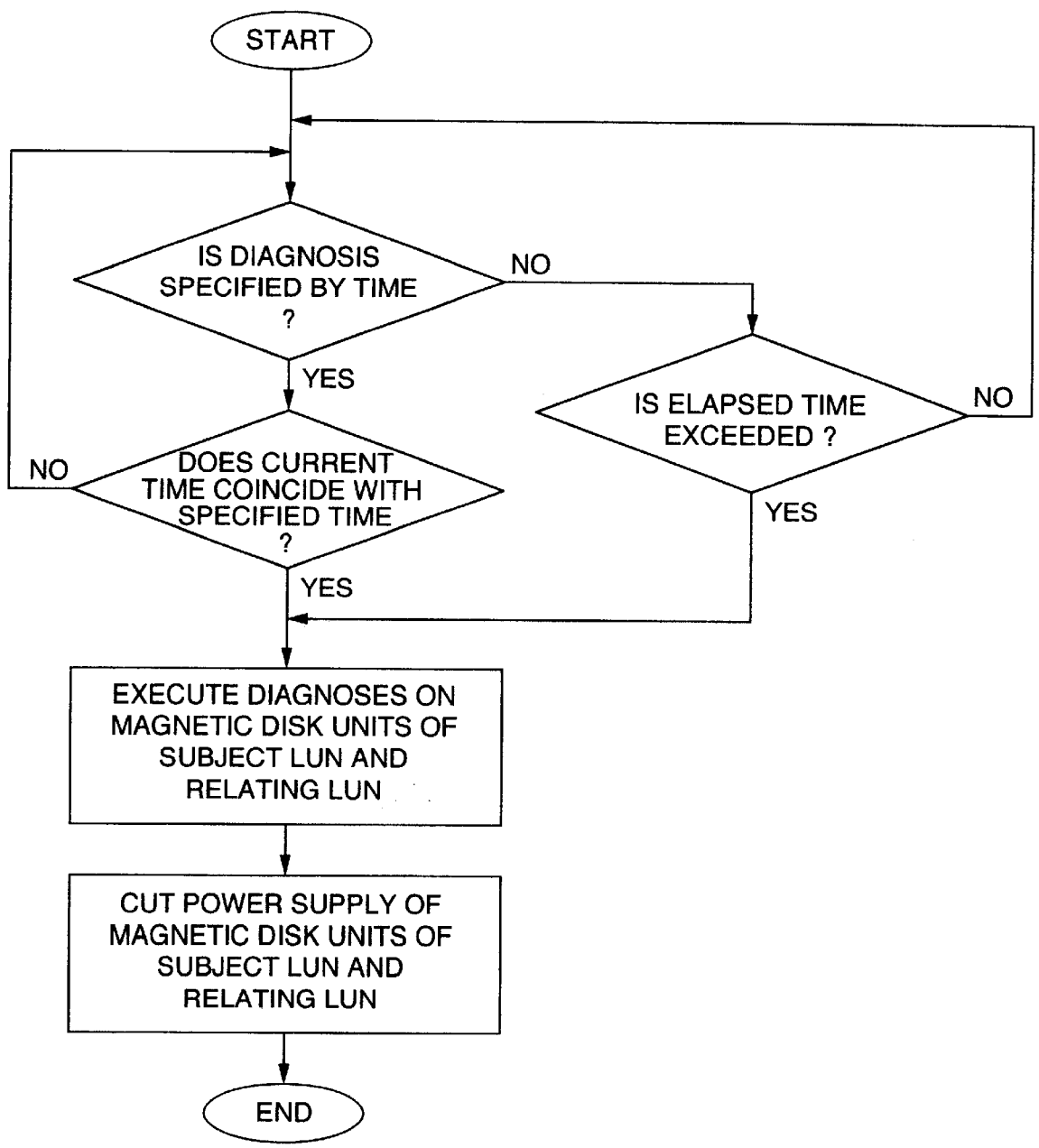

DISK ARRAY UNIT

This is a continuation of application Ser. No. 09/383,370, filed Aug. 26, 1999 now U.S. Pat. No. 6,583,947.

BACKGROUND OF THE INVENTION

The present invention relates to power saving of computer apparatuses, peripheral devices, and other electronic apparatuses, and in particular to energy saving of a disk array unit connected to a computer apparatus.

The disk array unit is a peripheral device of a computer apparatus, and is used as an external storage unit for storing data of the computer. A plurality of magnetic disk units are mounted on the disk array unit. When the disk array unit and a computer system serving as a host unit of the disk array unit are functioning, all of a plurality of magnetic disk units mounted on the disk array unit are typically operating.

In the specification of the present application, a term "operating" means that a magnetic disk unit is ready to response immediately when control information or data is inputted to the magnetic disk unit from a control unit or a host unit. It is now assumed that the magnetic disk unit is in the so-called sleep mode and a magnetic disk medium is in the still state. When a time required for the magnetic disk medium to be spun up to its ordinary number of revolutions has elapsed, the magnetic disk unit responds. This case is not included in the scope of the term "operating". Furthermore, the term "operating" does not include the case where the magnetic disk unit is in the power saving mode and it responds after the power saving mode has been canceled.

Furthermore, when viewed from a magnetic disk unit, the term "access" means whether a command intended for itself has been issued or whether information giving and receiving intended for itself has been requested. Typically, it corresponds to that in response to an instruction of information acquisition or storage of a host unit, a signal is issued from an electronic circuit of the host unit side including a drive interface to a magnetic disk unit intended for.

When an access from a host unit has occurred, the magnetic disk unit to be accessed must be operating so as to be capable of transmitting or receiving control information, the magnetic disk unit to be accessed must be operating. On the other hand, in the case where there is no access from a host unit or a control unit, it is not necessary to keep the magnetic disk unit in the "operating" state.

For magnetic disk units, there is typically a control method including the steps of throwing the power supply upon receiving access from a host unit, rotating a magnetic recording medium, and answering to the access (transmitting or receiving information), and gradually cutting the power supply of predetermined electronic circuits and a motor for rotating the magnetic recording medium after the answering has been finished. In other words, the magnetic disk unit has various power saving modes built-in, and has a function of selecting a predetermined power saving mode according to mainly the frequency of access from a host unit or a control unit, and automatically shifting into that mode.

In a conventional disk array unit, mounted magnetic disk units or magnetic disk units so set as to be recognizable from a host unit are controlled so as to become operating in response to start of the disk array unit. After the disk array unit has been started, the above described magnetic disk units mounted thereon remain operating until the power supply of the disk array unit is cut. If such manipulation as to cut the power supply of the disk array unit is conducted, such a sequence as to shift the magnetic disk units from the "operating" state to power supply off-state functions in response to the manipulation, and thereafter the power supply of the disk array unit is cut.

As for magnetic disk units which have not been so set as to be recognizable from a host unit and magnetic disk units mounted as spares, the power supply is thrown and a magnetic disk unit is made "operating", when a magnetic disk unit is so set as to be recognizable from a host unit or a magnetic disk unit for spare is used. Once a magnetic disk unit is made operating, the power supply is not cut individually until the power supply of the disk array unit is cut. In the case of a magnetic disk unit having an increased number of magnetic disk units, such as a disk array unit having several hundreds magnetic disk units connected, therefore, a power saving measure becomes indispensable.

SUMMARY OF THE INVENTION

In a disk array unit, it is not necessary to make all magnetic disk units operating, in the case where the number of accesses from the host unit is not many. Therefore, it is considered that power saving is possible by applying the above described control method. However, a time for making a magnetic disk unit "operating" upon receiving an access is required, and the performance of the disk array unit as a whole is significantly degraded. For preventing degradation of the performance, it is necessary to select and execute a power saving mode having a short return time to "operating", use a magnetic disk unit having a short time until spin up, or consider access to a memory for holding data instead of a magnetic disk unit.

Furthermore, in such a disk array unit that one set of magnetic disk units (physical unit) is not handled as one logical unit, power saving of disk array units cannot be realized by simply diverting the existing power saving mode of magnetic disk units.

In the case where there has been no access to one set of magnetic disk units (physical unit group) from the host unit or control unit for a predetermined time, one of a plurality of power saving modes is selected and the set of magnetic disk units is brought into the power saving mode. In this power saving mode, a mode for stopping the rotation of a magnetic recording medium is included.

In the case where one set of magnetic disk units (physical unit group) corresponds to two or more logical units, one of a plurality of power saving modes is selected and the set of magnetic disk units is brought into the selected power saving mode, provided that there has been no access to all of the two or more logical units from the host unit or control unit for a predetermined time.

In the case where one logical unit is defined for more than one set of magnetic disk units (physical unit group), one of a plurality of power saving modes is selected and the set of magnetic disk units is brought into the selected power saving mode, provided that there has been no access to all magnetic disk units corresponding to the one logical unit from the host unit or control unit for a predetermined time.

In order to execute such control, there are provided a means for associating a configuration of magnetic disk units with access from the host unit, a power saving control means for selecting a power saving mode of magnetic disk units recognized by the disk array unit, and a diagnosis means for diagnosing the state of magnetic disk units. Herein, the term "diagnosis" means confirming the operation of a magnetic disk unit to determine whether the magnetic disk unit is in the usable state. For example, an online verify command is executed, and it is determined whether that command causes normal termination.

BRIEF DESCRIPTION OF THE DRAWING

FIG. 2 is a diagram showing a management table according to an embodiment of the present invention;

FIG. 5 is a magnetic disk unit power supply diagnosis operation flow chart according to an embodiment of the present invention.

DETAILED DESCRIPTION OF THE INVENTION

Hereafter, embodiments of a disk array unit of the present invention will be described.

Figure 1:
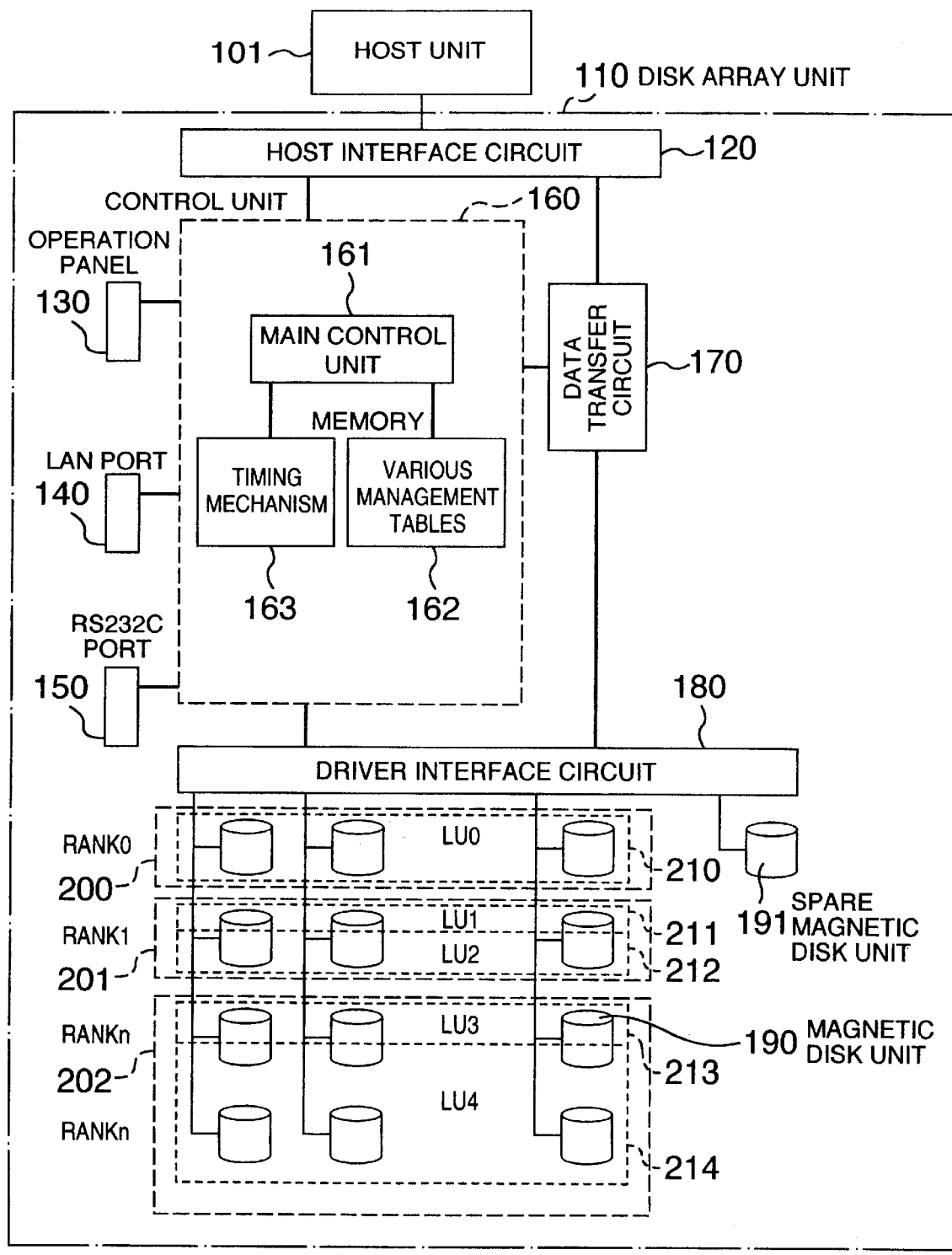
FIG. 1 is an entire configuration diagram of a disk array unit according to an embodiment of the present invention.

FIG. 1 shows an example of the internal configuration of a disk array unit 110 connected to a host unit 101.

The host unit 101 controls information reading and writing, and implements information reading or writing by issuing a command to the disk array unit 110.

The disk array unit 110 includes a host interface circuit 120, a control unit 160, a data base transfer circuit 170, a drive interface circuit 180, magnetic disk units 190, a spare magnetic disk unit 191, an operation panel 130, a LAN control unit 140, and an RS 232C control unit 150.

The control unit 160 is implemented by using a microprocessor and firmware for control. The control unit 160 includes a main control unit 161 and a timing mechanism 163 for managing time. On a memory 162 included in the control unit 160, various management tables are arranged.

If small sized magnetic disk units which are general purpose components are used as the magnetic disk units 190 and a spare magnetic disk unit 191, a great effect of manufacturing cost reduction is brought about. The magnetic disk units 190 are arranged in an array form so as to form a RAID (Redundant Array Inexpensive Disks) configuration (FIG. 1).

A RAID group is formed of one column (200, 201) or a plurality of columns (202). As for the magnetic disk units 190 forming a RAID group, a concept called RANK is introduced in order to make possible access from the host unit 101, and a logical unit is set for each RAID group configuration. In each same RANK, the storage area of each magnetic disk unit is divided (area division).

Typically in the disk array, user data, for example, is divided in data of a suitable size (striping), distributed to magnetic disk units, and stored in them. And it is desirable for the disk array to conduct data storage and access to its own magnetic disk units uniformly. Therefore, the concept called RANK is associated with the configuration including a plurality of logical magnetic disk units. Therefore, one set of magnetic disk units can be associated with a plurality of logical disk units or with less than one logical disk unit.

Association of RANKs with logical units is determined by setting configuration information of the disk array unit 110. It is possible to let n RANKs=one logical unit, one RANK=n logical units, or m RANKs=n logical units. In FIG. 1, LU 0 (210, logical unit number 0) is associated with RANK 0 (200), LU 1 (211) and LU 2 (212) are associated with RANK 1 (201), and LU3 (213) and LU 4 (214) are associated with RANK n (202).

When a fault has occurred in the magnetic disk units 190 forming a RAID group, the spare magnetic disk unit 191 is used as a magnetic disk unit for substitution. To be concrete, a diagnosis is executed to detect a fault, and the faulty magnetic disk unit 190 is substituted for the spare magnetic disk unit 191. In FIG. 1, only one spare magnetic disk unit is illustrated, but it is not restrictive.

FIG. 2 shows a structure of various management tables stored on the memory 162.

A magnetic disk unit management table 250 manages information of each of preset logical units. The preset logical unit is managed since its number is registered in "preset LUN". In the case of the configuration of the RANK n (202), the configuration has a plurality of columns, and consequently "management LUN" is used and a divisional branch number is registered therein for management. Furthermore, time when access to a logical unit from the host unit 101 has been received is registered in "access time". The position of the magnetic disk unit 190 in the preset logical unit is registered in "magnetic disk unit position". In the case where a plurality of logical units have been preset in the same RANK as shown in RANK n (202), other logical unit numbers included in the preset plurality of logical units are registered in "relating LUN". The time when the magnetic disk unit 190 has been brought into its power saving mode, or the time when the power supply of the magnetic disk unit 190 has been cut is registered in "power saving start time".

In "power saving waiting time" 260, there is registered time to elapse since the last access from the host unit 101 was received until the magnetic disk unit 190 is brought into the power saving mode or its power supply is cut.

In "diagnosis start time" 270, there is registered time to elapse since a magnetic disk unit 190 was brought into the power saving mode or the like until diagnosis of the magnetic disk unit 190 is started, or time when diagnosis of a magnetic disk 190 brought into the power saving mode or the like should be executed.

Figure 3:
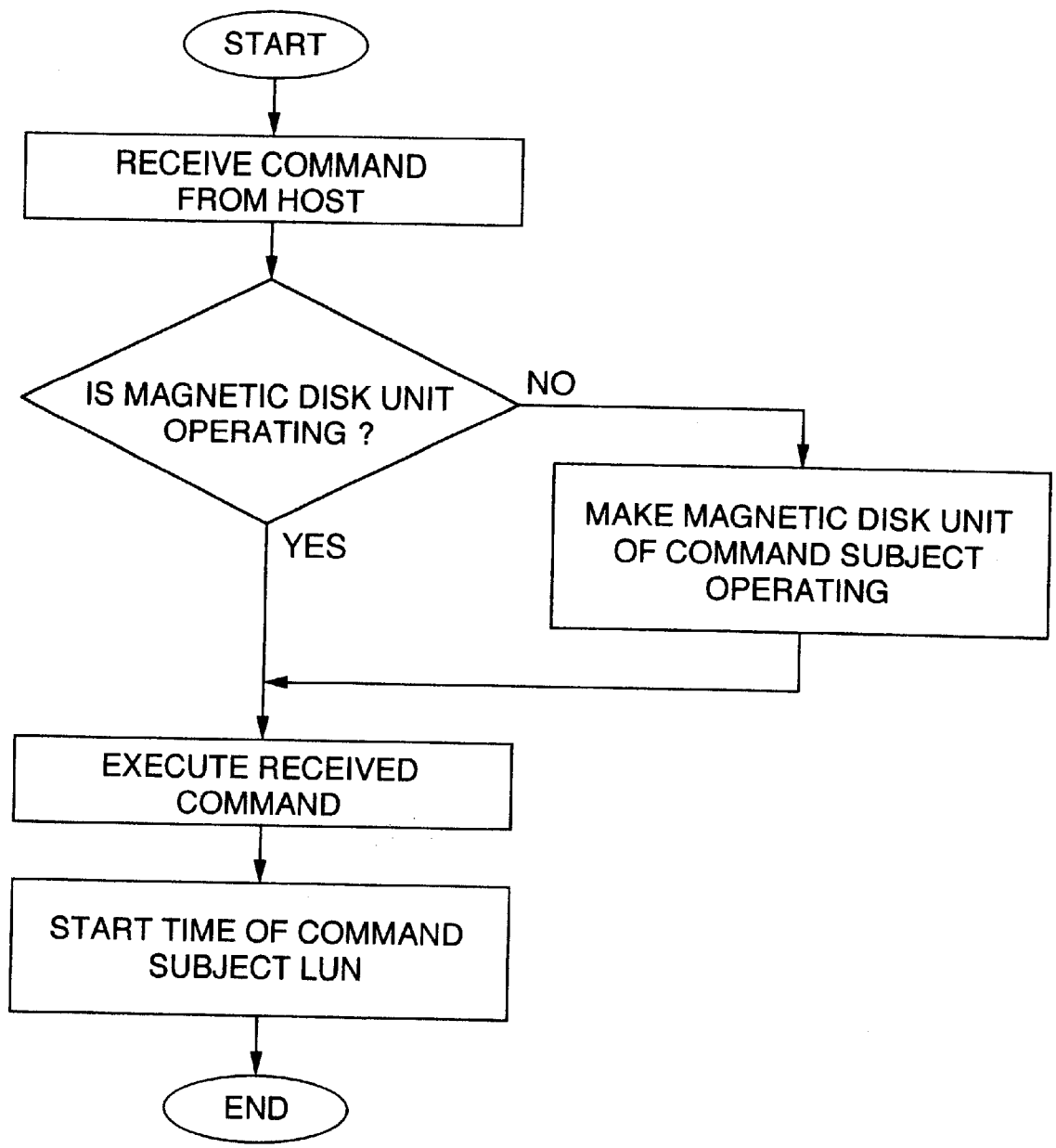
FIG. 3 is a magnetic disk unit power supply throwing operation flow chart according to an embodiment of the present invention.
Figure 4:
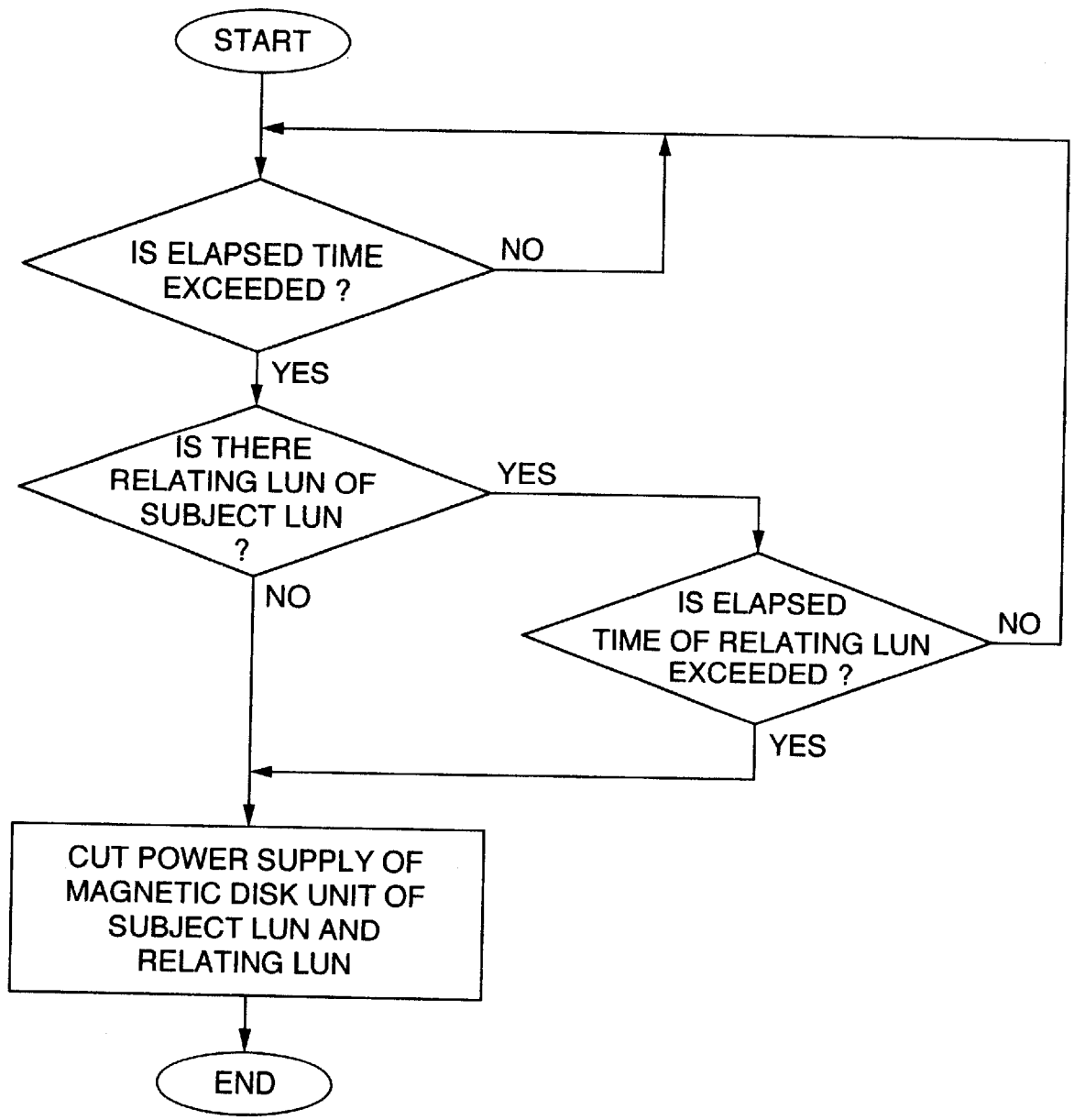
FIG. 4 is a magnetic disk unit power supply cutting operation flow chart according to an embodiment of the present invention.

Hereafter, a power saving method relating to the present invention will be described by referring to flow charts (FIGS. 3, 4 and 5).

The host unit 101 executes an application, and stores necessary information in the disk array unit 110. The necessary information is taken out or written into the disk array unit by read or write access, and makes a necessary function active.

When the disk array unit 110 is started, it throws the power supply of necessary magnetic disk units 190 in order to be able to respond to access from the host unit.

As for the spare magnetic disk unit 191, typically it is not accessed by the host unit 101. After the power supply of the spare magnetic disk unit 191 is thrown and it is confirmed that the spare magnetic disk unit 191 functions normally, therefore, the power supply is cut. Instead of cutting the power supply of the spare magnetic disk unit 191, the spare magnetic disk unit 191 may be kept waiting in the power saving mode.

After throwing the power supply of the magnetic disk units 190 and confirming normal operation of the magnetic disk units 190, the disk array unit 110 conducts registration of "preset LUN", "management LUN", "access time (the time when the normality of the magnetic disk units is confirmed)", "magnetic disk unit position", and "relating LUN" (FIG. 2). In the case where the RANK n (202) is formed of a plurality of magnetic disk units 190, information for dividing a logical unit into respective columns and managing the logical unit as respective columns is registered in the "management LUN". The LU 4 (214) is registered in the "management LUN" as LU 4-1 and LU 4-2.

In the case where a plurality of logical units are preset in the same RANK as indicated by RANK 1 (201), relating LUNs are registered in the "relating LUN". In the "relating LUN" of the LU 1 (211), LU 2 (212) is registered. In the "relating LUN" of the LU 2 (212), LU 1 (211) is registered.

After registering such information, power supply cutting processing shown in FIG. 4 and diagnosis processing shown in FIG. 5 are started. Instead of the power supply cutting processing, processing for the shift to the power saving mode may be conducted. In the case of the power supply cutting processing, the effect of power saving is great. Hereafter, therefore, an embodiment will be described laying stress on the power supply cutting processing. Instead of the power supply cutting, however, selection and execution of the power saving mode may be conducted.

As for the "access time" and the "power saving start time" (power supply cutting time), they are registered by referring to the timing mechanism 163 included in the control unit 160 for the current time.

When the disk array unit 110 has received access from the host unit 101, the power saving start time of magnetic disk units 190 belonging to a logical unit to be accessed is judged by referring to the magnetic disk unit management table 250. In the case where the power saving start time is not registered, the access is executed in succession. In the case where the power saving start time is registered, the power supply of the magnetic disk unit is in the off state or in the power saving mode. Therefore, the power supply of the magnetic disk units 190 registered in the magnetic disk unit position of the magnetic disk unit management table 250 is thrown or the power saving mode thereof is canceled, the power saving start time is cleared, and then the access is executed. After the access execution has been finished, the access time is updated to the current time.

In the power supply cutting processing shown in FIG. 4, the access time of magnetic disk unit management table 250 is monitored by taking a preset logical unit as the unit. As for a logical unit which has ceased to be accessed from the host unit, the time registered in the "access time" is compared with the current time. When the difference has exceeded the "power saving waiting time" 260, magnetic disk units 190 belonging to the subject logical unit are determined on the basis of the "magnetic disk unit position" of the magnetic disk unit management table 250, and the power supply of the magnetic disk units 190 registered in the "magnetic disk unit position" is cut or brought into the power saving mode. The time when the power supply has been cut is registered in the "power saving start time" (FIG. 2).

In the case where the "power saving waiting time" 260 has been exceeded, it is determined whether power supply should be thrown or cut (whether the mode is the power saving mode) on the basis of the state of the LU 2 (212) of the registered "relating LUN". In the case where the LU 2 (212) has not exceeded the power saving waiting time, it is judged that the power saving start time of the magnetic disk unit management table 250 is not registered and a magnetic disk unit 190 is being used in the LU 2 (212). The power supply of the magnetic disk unit is not cut, or it is not brought into the power saving mode. If the LU 2 (212) has exceeded the power saving waiting time, then the "power saving start time" of the magnetic disk unit management table 250 has already been finished in registration, and the LU 2 (212) has exceeded the power saving waiting time together with the LU 1 (211). Therefore, the power supply of the magnetic disk units 190 in the "magnetic disk unit position" is cut. The time when the power supply has been cut is registered in the "power saving start time".

In the case where the "power saving waiting time" 260 is exceeded for the LU 4 (214), it is determined whether the power supply should be cut on the basis of the "management LUN" in which the LU 4 (214) is registered. The LU 4 (214) is one logical unit configuration, but it is formed of a plurality of columns of magnetic disk units 190. Therefore, the LU 4 (214) is divisionally managed in the "management LUN". A first column is registered as LU 4-1, and a second column is registered as LU 4-2. As for the LU 4-1, the LU 3 (213) is registered in its "relating LUN". In the case where the "power saving start time" of the LU 3 (213) is not registered, therefore, the power supply of the magnetic disk units 190 of the first column is not cut, because the magnetic disk units are used in the LU 3 (213). As for the LU 4-2, there are no relating LUs, and consequently the power supply of magnetic disk units 190 of the second column is cut. The time when the power supply has been cut is registered in the "power saving start time". In this way, in the LU 4, it is made possible to cut the power supply of a part of a group of magnetic disk units forming one logical unit or shift the power supply of the part of the group into the power saving mode.

In the diagnosis processing of FIG. 5, the "power saving start time" of the magnetic disk management table 250 is monitored by taking a preset logical unit as the unit. The time registered in the "power saving start time" is compared with the current time. When the difference has exceeded the "diagnosis start time" 270, magnetic disk units 190 belonging to the subject logical unit are determined from the "magnetic disk unit position" of the magnetic disk unit management table 250, and diagnosis of the magnetic disk units 190 registered in the "magnetic disk unit position" is executed. After the diagnosis has been finished, the power saving mode is started.

In the case where a diagnosis is executed, access processing from the host unit 101 is given priority. When access has been received, the diagnosis is stopped and access is executed. After the access processing has been finished, the diagnosis is resumed.

As for the diagnosis of the magnetic disk units 190, time of twenty-four hour clock is registered in the "diagnosis start time" 270. Instead of referring to the time elapsed since the power supply is cut, when the registered time is reached, the diagnosis is started. Alternatively, the diagnosis may be started on the basis of the time elapsed since the power supply is cut.

In the case where a diagnosis is executed, access processing from the host unit 101 is given priority. When access has been received, the diagnosis is stopped and access is executed. After the access processing has been finished, the diagnosis is resumed. Diagnoses for magnetic disk units of a logical unit registered in the magnetic disk unit management table 250 are executed simultaneously by taking a logical unit as the unit: In the case where a logical unit is formed of a plurality of columns, diagnosis is executed by taking, as the unit, a "management LUN" of management conducted by taking a column as the unit. Diagnoses of as many magnetic disk units 190 as the number of magnetic disk units in a maximum column configuration are conducted simultaneously. In the case of the configuration of FIG. 1, diagnoses of five magnetic units including two magnetic disk units which are not illustrated are conducted simultaneously in each RANK. In the case where, for example, four magnetic disk units are mounted on one RANK, diagnoses of the four magnetic disk units are conducted simultaneously. This aims at checking logical magnetic disk units functioning as a disk array of that RANK before use.

Although it is a special embodiment, the present invention can also be applied to a disk array having only one magnetic disk unit in one RANK. In this case, one set of magnetic disk units is formed of one magnetic disk unit.

Diagnosis of the spare magnetic disk unit 191 is conducted when a fixed time has elapsed. In the case where time of twenty-four hour clock is registered in the "diagnosis start time" 270, the diagnosis of the spare magnetic disk unit 191 may be conducted when the registered time has been reached.

The "power saving start time" 260 and the "diagnosis start time" can be altered from the host command, operation panel 130, the LAN port 140, and the RS 232C port. When a directive of alteration has been received, information of the memory 162 is updated. Alteration according to a host command is conducted by a vendor unique command directing alteration of such information. Alteration using the operation panel 130 is conducted by displaying an alteration setting menu of such information and making an operator inputting a value to be altered. Alteration using the LAN port and the RS 232C port is conducted by prescribing a specific interface, burying information to be altered into the interface, and sending information from a device to which the LAN and the RS 232C are connected. The altered information is written into the memory 162 when an alteration directive is given. When writing has been finished, the altered information is made effective.

The present invention can suppress the power consumption of magnetic disk units mounted on the disk array unit. Furthermore, since the subjects are magnetic disk units which are not accessed from the host unit, it is made possible to save energy while preventing significant performance degradation. Furthermore, by conducting a diagnosis on magnetic disk units cut in the power supply, it is possible to confirm the reliability of magnetic disk units which are often susceptible to power supply cutting.

To be more concrete, in one magnetic disk unit requiring electric power of 20 W at the time of rotation start, its electronic circuit consumes 5.5 W at the time of read/write, and consumes 3.5 W at the time of read/write idle. A spindle of that magnetic disk unit consumes electric power in the range of 4 to 5 W at the time of idle rotation. If in this case the power saving mode for stopping the function of the electronic circuit is selected, the power consumption of at least 3.5 W is prevented. If the rotation of the spindle is also stopped, power consumption in the range of 4 to 5 W is prevented in addition.

Actually, power saving is conducted by taking a RANK as the unit. If the electronic circuit of one RANK is in the power saving mode in a disk array having a five column configuration, power consumption of approximately 18 W is prevented. If the rotation of the spindle is also stopped, power consumption in the range of 20 to 25 W is prevented. According to use of the disk array unit, these numerical values increase or decrease. For example, because of a change in access demand between day and night in twenty-four hour continuous running and execution time of the power saving mode consequent thereupon, the power saving effect becomes great.

What is claimed is:

1. A disk array unit for exchanging information with a host unit, said disk array unit comprising:

a plurality of disk units for storing information; and a control unit for conducting control so as to write information into a logical unit formed by using information storage areas of said plurality of disk units or read information from said logical unit, in response to a request sent from said host unit, wherein if an information write or read request has not been received from said host unit in said logical unit for a predetermined time, said control unit performs power saving of power supply for said plurality of disk units corresponding to said logical unit, and wherein when a predetermined time has elapsed after start of the power saving or at a specified time, said control unit effects control to conduct diagnosis processing on said plurality of disk units subjected to power saving.

2. A disk array unit according to claim 1, wherein a plurality of said logical units are provided for said plurality of disk units, and wherein if a write or read request has not been received from said host unit in all of said plurality of logical units for a predetermined time, said control unit performs power saving of power supply for said plurality of disk units corresponding to said plurality of logical units and conducts a diagnosis of said plurality of disk units subjected to power saving.

3. A disk array unit according to claim 1, further comprising:

a timing mechanism for measuring a time at which an information write or read request sent from said host unit to said logical unit is received, wherein said control unit determines that there is no write or read request from said host unit for a predetermined time based on the time measured by said timing mechanism.

4. A disk array unit according to claim 1, wherein said control unit performs power saving of power supply for said plurality of disk units corresponding to said logical unit by using one of a first power saving mode for suppressing power consumption of a part of an electronic circuit and a second power saving mode for suppressing power consumption by controlling rotation of a spindle, and wherein if a write or read request has not been received from said host unit in said logical unit for a predetermined time, said control unit performs power saving of power supply for said plurality of disk units corresponding to said logical unit by using said first power saving mode.

5. A disk array unit according to claim 1, wherein said control unit performs power saving of power supply for said plurality of disk units corresponding to said logical unit by using one of a first power saving mode for suppressing power consumption of a part of an electronic circuit and a second power saving mode for suppressing power consumption by controlling rotation of a spindle, and wherein if a write or read request has not been given from said host unit to said logical unit for a predetermined time, said control unit performs power saving of power supply for said plurality of disk units corresponding to said logical unit by using said second power saving mode.

6. A disk array unit according to claim 1, wherein said control unit comprises:

a management information recording device for recording information concerning said logical unit and information concerning said plurality of disk units corresponding to said logical unit in association with each other.

7. A disk array unit according to claim 1, wherein a plurality of said logical units are provided for said plurality of disk units, and wherein if a write or read request has not been received from said host unit in all of said plurality of logical units for a predetermined time, said control unit performs power saving of power supply for said plurality of disk units corresponding to said plurality of logical units.

8. A disk array unit according to claim 7, wherein said control unit comprises:

a management information recording device for recording information concerning said plurality of logical units and information concerning said plurality of disk units corresponding to said plurality of logical units in association with each other.

9. A disk array unit according to claim 8, wherein said management information recording device records information indicating that said plurality of logical units are related to each other.

10. A disk array unit according to claim 7, wherein said control unit performs power saving of power supply for said plurality of disk units corresponding to said plurality of logical units by using a power saving mode for suppressing power consumption by controlling rotation of a spindle.

11. A disk array unit for exchanging information with a host unit, said disk array unit comprising:

a plurality of first disk units for storing information;

a plurality of second disk units for storing information; and a control unit for conducting control so as to write information into a first logical unit formed by using information storage areas in said plurality of first disk units or read information from said first logical unit, in response to a request sent from said host unit, or conducting control so as to write information into a second logical unit formed by using information storage areas in said plurality of second disk units or read information from said second logical unit, in response to a request sent from said host unit, wherein if an information write or read request has not been received from said host unit in said first logical unit and said second logical unit for a predetermined time, said control unit performs power saving of power supply for said plurality of first disk units corresponding to said first logical unit and said plurality of second disk units corresponding to said second logical unit, and wherein when a predetermined time has elapsed after start of the power saving or at a specified time, said control unit effects control to conduct diagnosis processing on said plurality of disk units subjected to power saving.

12. A disk array unit according to claim 11, wherein said control unit comprises:

a management information recording device for recording information concerning said first logical unit and information concerning said plurality of first disk units corresponding to said first logical unit in association with each other, and recording information concerning said second logical unit and information concerning said plurality of second disk units corresponding to said second logical unit in association with each other.

13. A disk array unit according to claim 12, wherein said management information recording device records information indicating that said first logical unit and said second logical unit are related to each other.

14. A disk array unit according to claim 11, wherein said control unit performs power saving of power supply for said plurality of first disk units corresponding to said first logical unit and said plurality of second disk units corresponding to said second logical unit by using a power saving mode for suppressing power consumption by controlling rotation of a spindle.

15. A disk array unit for exchanging information with a host unit, said disk array unit comprising:

a plurality of first disk units for storing information;

a plurality of second disk units for storing information; and a control unit for conducting control so as to write information into a first logical unit formed by using information storage areas in said plurality of first disk units or read information from said first logical unit, in response to a request sent from said host unit, or conducting control so as to write information into a second logical unit formed by using information storage areas in said plurality of second disk units or read information from said second logical unit, in response to a request sent from said host unit, wherein if a write or read request has not been received from said host unit in said first logical unit for a predetermined time, said control unit performs power saving of power supply for said plurality of first disk units corresponding to said first logical unit without performing power saving of power supply for said plurality of second disk units corresponding to said second logical unit, and wherein when a predetermined time has elapsed after start of the power saving or at a specified time, said control unit effects control to conduct diagnosis processing on said plurality of first disk units subjected to power saving.

16. A disk array unit according to claim 15, wherein said control unit comprises:

a management information recording device for recording information concerning said first logical unit and information concerning said plurality of first disk units corresponding to said first logical unit in association with each other, and recording information concerning said second logical unit and information concerning said plurality of second disk units corresponding to said second logical unit in association with each other.

17. A disk array unit according to claim 16, wherein said management information recording device records information indicating that said first logical unit and said second logical unit are related to each other.

18. A disk array unit according to claim 15, wherein said control unit performs power saving of power supply for said plurality of first disk units corresponding to said first logical unit by using a power saving mode for suppressing power consumption by controlling rotation of a spindle.

19. A storage system for accepting a request of writing or reading data from host unit, said storage system comprising:

a plurality of disk units for storing data; and a control unit for conducting control so as to write data into a logical unit formed by using information storage areas of said plurality of disk units or read data from said logical unit, in response to a write or read request sent from said host unit, wherein when a certain time elapses from a time at which said logical unit receives a last data write or read request from said host unit, said control unit performs power saving of power supply for said plurality of disk units corresponding to said logical unit, and wherein when a predetermined time has elapsed after start of the power saving or at a specified time, said control unit effects control so as to conduct diagnosis processing on said plurality of disk units subjected to power saving.

20. A storage system according to claim 19, wherein a plurality of said logical units are provided for said plurality of disk units, and wherein when a write or read request from said host unit to all of said plurality of logical units is not received for a predetermined time, said control unit performs power saving of power supply for said plurality of disk units corresponding to said plurality of logical units and conducts a diagnosis of said plurality of disk units subjected to power saving.

21. A storage system according to claim 19, further comprising:

a timing mechanism for measuring a time at which an information write or read request sent from said host unit to said logical unit is received, wherein said control unit determines that a certain time elapses from a time at which a write or read request from said host unit is received on the basis of the time measured by said timing mechanism.

22. A storage system according to claim 19, wherein said control unit performs power saving of power supply for said plurality of disk units corresponding to said logical unit by using one of a first power saving mode for suppressing power consumption of a part of an electronic circuit and a second power saving mode for suppressing power consumption by controlling rotation of a spindle, and wherein when a certain time elapses from a time at which a write or read request from said host unit to said logical unit is received, said control unit performs power saving of power supply for said plurality of disk units corresponding to said logical unit by using said first power saving mode.

23. A storage system according to claim 19, wherein said control unit performs power saving of power supply for said plurality of disk units corresponding to said logical unit by using one of a first power saving mode for suppressing power consumption of a part of an electronic circuit and a second power saving mode for suppressing power consumption by controlling rotation of a spindle, and wherein when a certain time elapses from a time at which a write or read request from said host unit to said logical unit is received, said control unit performs power saving of power supply for said plurality of disk units corresponding to said logical unit by using said second power saving mode.

24. A storage system according to claim 19, wherein said control unit comprises:

a management information recording device for recording information concerning said logical unit and information concerning said plurality of disk units corresponding to said logical unit in association with each other.

25. A storage system according to claim 19, wherein a plurality of said logical units are provided for said plurality of disk units, and wherein when a certain time elapses from a time at which write or read requests are received from said host unit to all of said plurality of logical units, said control unit performs power saving of power supply for said plurality of disk units corresponding to said plurality of logical unit.

26. A storage system according to claim 25, wherein said control unit comprises:

a management information recording device for recording information concerning said plurality of logical units and information concerning said plurality of disk units corresponding to said plurality of logical units in association with each other.

27. A storage system according to claim 26, wherein said management information recording device records information indicating that said plurality of logical units are related to each other.

28. A storage system according to claim 25, wherein said control unit performs power saving of power supply for said plurality of disk units corresponding to said plurality of logical units by using a power saving mode for suppressing power consumption by controlling rotation of a spindle.

29. A storage system for accepting a request of writing or reading data from a host unit, said storage system comprising:

a plurality of first disk units for storing data;

a plurality of second disk units for storing data; and a control unit for conducting control so as to write data into a first logical unit formed by using information storage areas in said plurality of first disk units or read data from said first logical unit, in response to a write or read request sent from said host unit, or conducting control so as to write data into a second logical unit formed by using information storage areas in said plurality of second disk units or read data from said second logical unit, in response to a write or read request sent from said host unit, wherein when a certain time elapses from a time at which write or read requests from said host unit to said first logical unit and said second logical unit are received, said control unit performs power saving of power supply for said plurality of first disk units corresponding to said first logical unit and said plurality of second disk units corresponding to said second logical unit, and wherein when a predetermined time has elapsed after start of the power saving or at a specified time, said control unit effects control so as to conduct diagnosis processing on said plurality of disk units subjected to power saving.

30. A storage system according to claim 29, wherein said control unit comprises:

a management information recording device for recording information concerning said first logical unit and information concerning said plurality of first disk units corresponding to said first logical unit in association with each other, and recording information concerning said second logical unit and information concerning said plurality of second disk units corresponding to said second logical unit in association with each other.

31. A storage system according to claim 30, wherein said management information recording device records information indicating that said first logical unit and said second logical unit are related to each other.

32. A storage system according to claim 29, wherein said control unit performs power saving of power supply for said plurality of first disk units corresponding to said first logical unit and said plurality of second disk units corresponding to said second logical unit by using a power saving mode for suppressing power consumption by controlling rotation of a spindle.

33. A storage system for accepting a writ or read request from a host unit, said storage system comprising:

a plurality of first disk units for storing data;

a plurality of second disk units for storing data; and a control unit for conducting control so as to write data into a first logical unit formed by using information storage areas in said plurality of first disk units or read data from said first logical unit, in response to a write or read request sent from said host unit, or conducting control so as to write data into a second logical unit formed by using information storage areas in said plurality of second disk units or read data from said second logical unit, in response to a write or read request sent from said host unit, wherein when a certain time elapses from a time at which a write or read request from said host unit to said first logical unit is received, said control unit performs power saving of power supply for said plurality of first disk units corresponding to said first logical unit without performing power saving of power supply for said plurality of second disk units corresponding to said second logical unit, and wherein when a predetermined time has elapsed after start of the power saving or at a specified time, said control unit effects control so as to conduct diagnosis processing on said plurality of first disk units subjected to power saving.

34. A storage system according to claim 33, wherein said control unit comprises:

a management information recording device for recording information concerning said first logical unit and information concerning said plurality of first disk units corresponding to said first logical unit in association with each other, and recording information concerning said second logical unit and information concerning said plurality of second disk units corresponding to said second logical unit in association with each other.

35. A storage system according to claim 34, wherein said management information recording device records information indicating that said first logical unit and said second logical unit are related to each other.

36. A storage system according to claim 33, wherein said control unit performs power saving of power supply for said plurality of first disk units corresponding to said first logical unit by using a power saving mode for suppressing power consumption by controlling rotation of a spindle.

* * * * *

UNITED STATES PATENT AND TRADEMARK OFFICE
CERTIFICATE OF CORRECTION

| | |
|---|---|
| PATENT NO. | : 6,826,005 B2 |
| APPLICATION NO. | : 10/412232 |
| DATED | : November 30, 2004 |
| INVENTOR(S) | : Kazuo Hakamata, Kenichi Takamoto and Masaaki Kobayashi |

It is certified that error appears in the above-identified patent and that said Letters Patent is hereby corrected as shown below:

Column 3, lines 30-34, replace with the following:

The disk array unit 110 includes a host interface circuit 120, a control unit 160, a data "base" transfer circuit 170, a "drive" --driver-- interface circuit 180, magnetic disk units 190, a spare magnetic disk unit 191, an operation panel 130, a LAN "control unit" --port-- 140, and an RS 232C "control unit" --port-- 150.

Column 5, lines 27-42, replace with the following:

When the disk array unit 110 has received access from the host unit 101, the power saving start time of magnetic disk units 190 belonging to a logical unit to be accessed is judged by referring to the magnetic disk unit management table 250. In the case where the power saving start time is not registered, the access is executed in succession. In the case where the power saving start time is registered, the power supply of the magnetic disk "unit" --units-- is in the off state or in the power saving mode. Therefore, the power supply of the magnetic disk units 190 registered in the magnetic disk unit position of the magnetic disk unit management table 250 is thrown or the power saving mode thereof is canceled, the power saving start time is cleared, and then the access is executed. After the access execution has been finished, the access time is updated to the current time.

Signed and Sealed this
Fifth Day of April, 2011

David J. Kappos
*Director of the United States Patent and Trademark Office*